(12) United States Patent
Thumpudi et al.

(10) Patent No.: US 10,582,132 B2
(45) Date of Patent: *Mar. 3, 2020

(54) DYNAMIC RANGE EXTENSION TO PRODUCE IMAGES

(71) Applicant: Microsoft Technology Licensing, LLC, Redmond, WA (US)

(72) Inventors: Naveen Thumpudi, Redmond, WA (US); Louis-Philippe Bourret, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/224,177

(22) Filed: Dec. 18, 2018

(65) Prior Publication Data

US 2019/0124248 A1 Apr. 25, 2019

Related U.S. Application Data

(63) Continuation of application No. 15/385,578, filed on Dec. 20, 2016, now Pat. No. 10,187,584.

(51) Int. Cl.
*H04N 5/235* (2006.01)
*H04N 5/225* (2006.01)
(Continued)

(52) U.S. Cl.
CPC ......... *H04N 5/2352* (2013.01); *H04N 5/2253* (2013.01); *H04N 5/2258* (2013.01); *H04N 5/2353* (2013.01); *H04N 5/2355* (2013.01); *H04N 5/2356* (2013.01); *H04N 5/243* (2013.01); *H04N 5/265* (2013.01); *H04N 5/35563* (2013.01)

(58) Field of Classification Search
None
See application file for complete search history.

(56) References Cited

U.S. PATENT DOCUMENTS

| 6,240,217 B1 | 5/2001 | Ercan et al. |
| 7,365,664 B2 | 4/2008 | Caduff et al. |

(Continued)

FOREIGN PATENT DOCUMENTS

WO 2014138697 A1 9/2014

OTHER PUBLICATIONS

"Non Final Office Action Issued in U.S. Appl. No. 15/385,578", dated Mar. 12, 2018, 10 Pages.

(Continued)

*Primary Examiner* — James M Hannett
(74) *Attorney, Agent, or Firm* — Arent Fox LLP

(57) ABSTRACT

Described are examples for generating a high dynamic range image from a plurality of images. A plurality of images of a real world scene can be obtained from one or more image sensors, wherein at least two of the plurality of images are captured based on different intensity parameters. Intensity information for the real world scene can be determined based at least in part on processing the at least two of the plurality of images. A high dynamic range image corresponding to the real world scene can be generated based at least in part on adding the intensity information to pixels of at least one of the plurality of images.

20 Claims, 4 Drawing Sheets

(51) Int. Cl.
*H04N 5/265* (2006.01)
*H04N 5/243* (2006.01)
*H04N 5/355* (2011.01)

(56) References Cited

U.S. PATENT DOCUMENTS

| | | | |
|---|---|---|---|
| 7,636,115 B2 | 12/2009 | Hong et al. | |
| 8,866,927 B2* | 10/2014 | Levoy | H04N 5/2353 |
| | | | 348/222.1 |
| 9,036,065 B1* | 5/2015 | Vogelsang | H04N 5/378 |
| | | | 348/308 |
| 9,204,113 B1* | 12/2015 | Kwok | H04N 5/2355 |
| 9,749,551 B2* | 8/2017 | Geiss | H04N 17/002 |
| 9,774,801 B2* | 9/2017 | Hseih | H04N 5/23235 |
| 10,187,584 B2* | 1/2019 | Thumpudi | H04N 5/2352 |
| 2002/0101524 A1 | 8/2002 | Acharya | |
| 2003/0184569 A1 | 10/2003 | Koga et al. | |
| 2006/0133688 A1 | 6/2006 | Kang et al. | |
| 2007/0285526 A1 | 12/2007 | Mann et al. | |
| 2009/0113346 A1 | 4/2009 | Wickramasuriya et al. | |
| 2009/0158167 A1 | 6/2009 | Wang et al. | |
| 2010/0271512 A1 | 10/2010 | Garten | |
| 2011/0074983 A1* | 3/2011 | Bush | G03B 39/06 |
| | | | 348/241 |
| 2012/0081577 A1* | 4/2012 | Cote | H04N 19/80 |
| | | | 348/231.99 |
| 2012/0201456 A1 | 8/2012 | El-mahdy et al. | |
| 2012/0274814 A1 | 11/2012 | Wajs | |
| 2012/0314100 A1* | 12/2012 | Frank | H04N 5/35554 |
| | | | 348/229.1 |
| 2013/0162625 A1 | 6/2013 | Schmit et al. | |
| 2014/0002694 A1 | 1/2014 | Levy et al. | |
| 2014/0184881 A1* | 7/2014 | McKinley | H04N 5/2253 |
| | | | 348/345 |
| 2014/0341272 A1 | 11/2014 | Miller et al. | |
| 2016/0165159 A1* | 6/2016 | Hseih | H04N 5/23235 |
| | | | 348/273 |

OTHER PUBLICATIONS

Grossberg, et al., "High Dynamic Range from Multiple Images: Which Exposures to Combine?", In Proceedings of ICCV Workshop on Color and Photometric Methods in Computer Vision, vol. 16, Oct. 2003, 8 Pages.
"International Preliminary Report on Patentability Issued in PCT Application No. PCT/US2017/065937", dated Jul. 4, 2019, 7 Pages.
"International Search Report & Written Opinion Issued in PCT Application No. PCT/US2017/065937", dated Feb. 28, 2018, 11 Pages.
Robertson, et al., "Estimation-Theoretic Approach to Dynamic Range Enhancement using Multiple Exposures", In Journal of Electronic Imaging, vol. 12, Issue 2, Apr. 2003, pp. 219-228.
"Final Office Action Issued in U.S. Appl. No. 14/945,357", dated Jul. 29, 2019, 48 Pages.

* cited by examiner

DYNAMIC RANGE EXTENSION TO PRODUCE IMAGES

CLAIM OF PRIORITY UNDER 35 U.S.C. § 119

The present Application for Patent is a Continuation of U.S. patent application Ser. No. 15/385,578, entitled "DYNAMIC RANGE EXTENSION TO PRODUCE HIGH DYNAMIC RANGE IMAGES" filed Dec. 20, 2016, which is assigned to the assignee hereof and hereby expressly incorporated by reference herein for all purposes.

BACKGROUND

Many computing devices are equipped with cameras for digitally capturing images, video, etc. for storing on the computing device or other repositories for subsequent viewing. Cameras are typically capable of capturing raw images, and down-converting the raw images to 8-bit images for processing by a computing device, and/or display on an associated display. The 8-bit images may include images in a red, green, blue (RGB) color space, a YUV color space, etc., which may be in an image container defined by joint photographic experts group (JPEG). As camera processing capabilities increase, so do technologies for photo capture and display. Additional standards have been proposed for displaying high dynamic range images, such as ultra high definition (UHD), wide color gamut (WCG), high dynamic range 10-bit (HDR10), and high dynamic range 12-bit (HDR12), which can be capable of producing 10-bit to 14-bit images.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a method for generating a high dynamic range image from a plurality of images. The method includes obtaining, via one or more image sensors, the plurality of images of a real world scene, where at least two of the plurality of images are captured based on different intensity parameters, and where the at least two of the plurality of images are captured as standard dynamic range images. The method also includes determining light intensity information for the real world scene based at least in part on processing the at least two of the plurality of images, and generating the high dynamic range image corresponding to the real world scene based at least in part on adding the light intensity information to pixels of at least one of the plurality of images.

In another example, a device for generating a high dynamic range image from a plurality of images is provided. The device includes one or more image sensors configured to obtain the plurality of images of a real world scene, where at least two of the plurality of images are captured based on different intensity parameters, and where the at least two of the plurality of images are captured as standard dynamic range images, a memory for storing one or more parameters or instructions for generating the high dynamic range image from the plurality of images, and at least one processor coupled to the memory. The at least one processor is configured to determine light intensity information for the real world scene based at least in part on processing the at least two of the plurality of images, and generate the high dynamic range image corresponding to the real world scene based at least in part on adding the light intensity information to pixels of at least one of the plurality of images.

In another example, a computer-readable medium, including code executable by one or more processors for generating a high dynamic range image from a plurality of images is provided. The code includes code for obtaining, via one or more image sensors, the plurality of images of a real world scene, where at least two of the plurality of images are captured based on different intensity parameters, and where the at least two of the plurality of images are captured as standard dynamic range images, code for determining light intensity information for the real world scene based at least in part on processing the at least two of the plurality of images, and code for generating the high dynamic range image corresponding to the real world scene based at least in part on adding the light intensity information to pixels of at least one of the plurality of images.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to a converting images of a first bit depth (e.g., 8-bit) to images of a second larger bit depth (e.g., 10-bit) by introducing intensity information into the additional bits. For example, one or more image sensors can be used to capture images using varying intensity parameters, such as photon sensitivity, light intensity, exposure time variations, aperture variations, etc. In one example, an image sensor can capture a plurality of images of a real world scene over a period of time (e.g., sequential images) and can vary the intensity parameters for one or more of the plurality of images. In another example, the image sensor can capture interleaved pixels of the real world scene in separate images by varying the intensity parameters for each image. In yet another example, multiple image sensors can capture images of the real world scene at similar periods of time by varying the intensity parameters. In any case, the images can be compared to derive intensity information for at least a portion of a plurality of pixels in the images. Accordingly, a high dynamic range (HDR) image can be generated by adding the intensity information for the corresponding pixels. Additional bits can be used to store the intensity information, which can yield a larger bit image than the image(s) captured by the image sensor(s). As referenced herein, an HDR image can refer to an image having a higher bit depth than one or more images from which the HDR image is generated.

Similarly, for example, a device can receive the HDR image for displaying. The device can determine intensity information for a plurality of pixels in the HDR image. Based on the intensity information and the defined pixel color, the device can select a display color for rendering the pixel, and can display the pixels of the image.

Figure 1:
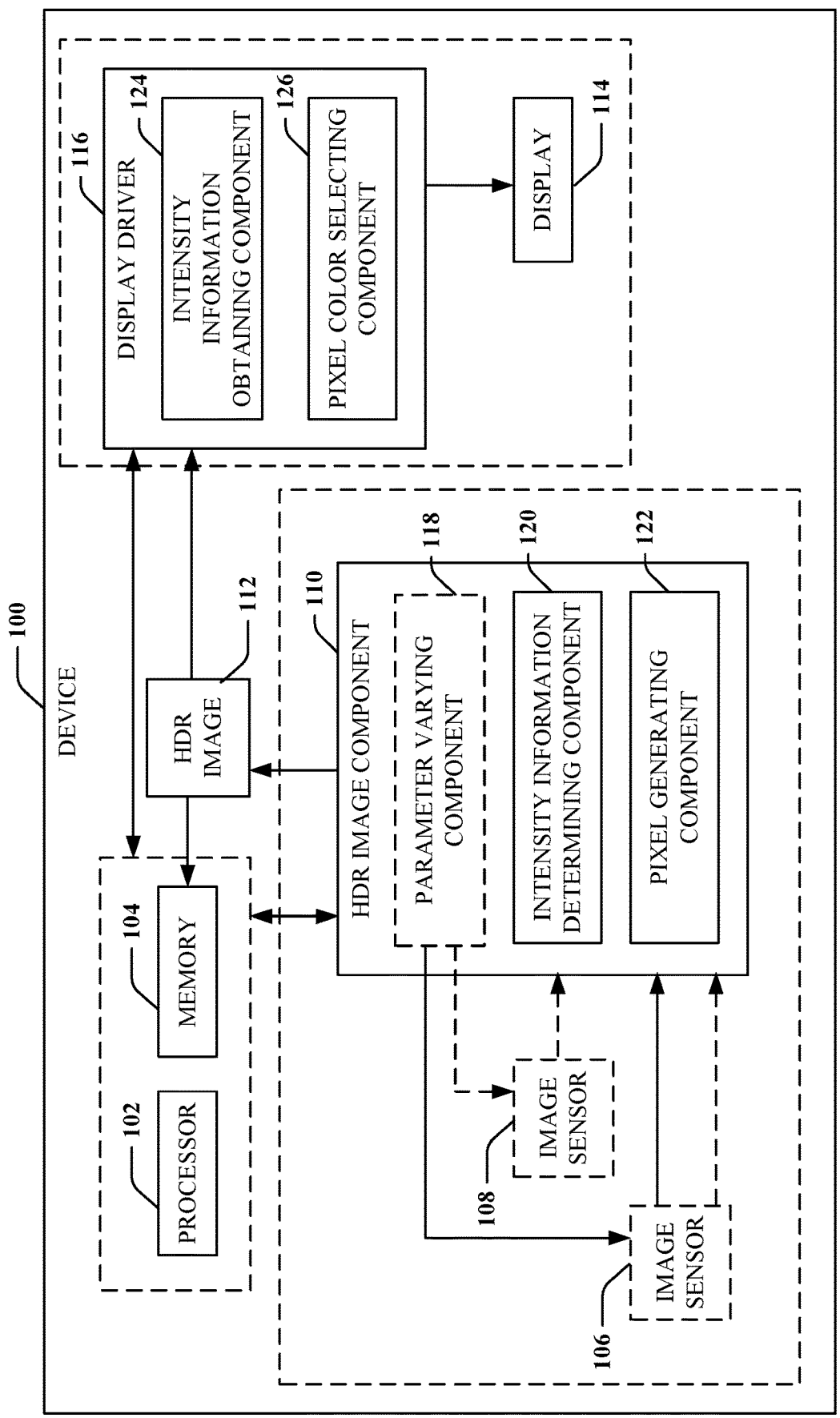
FIG. 1 is a schematic diagram of an example of a device for generating high dynamic range (HDR) images from a plurality of images.
Figure 2:
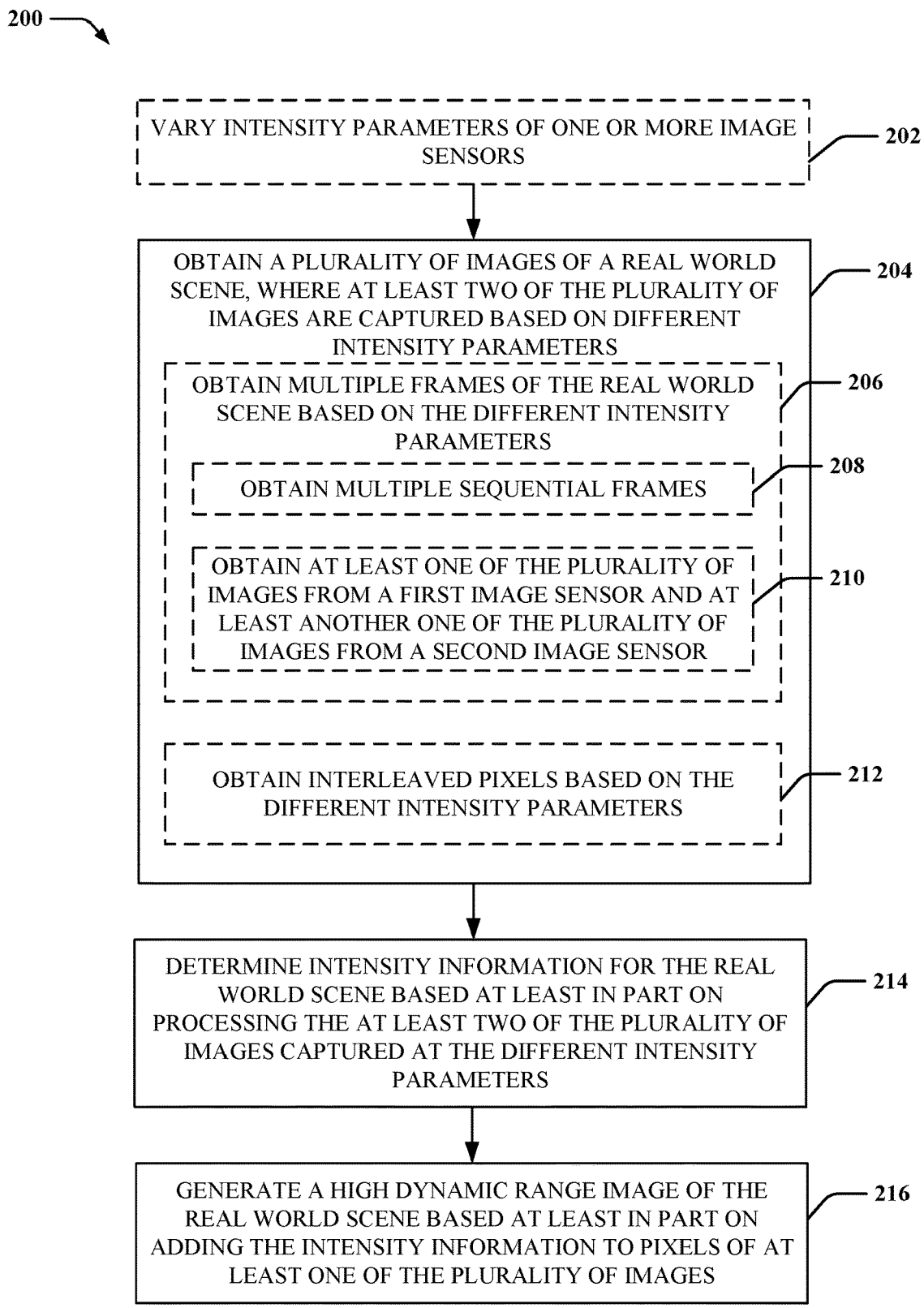
FIG. 2 is a flow diagram of an example of a method for generating HDR images from a plurality of images.
Figure 3:
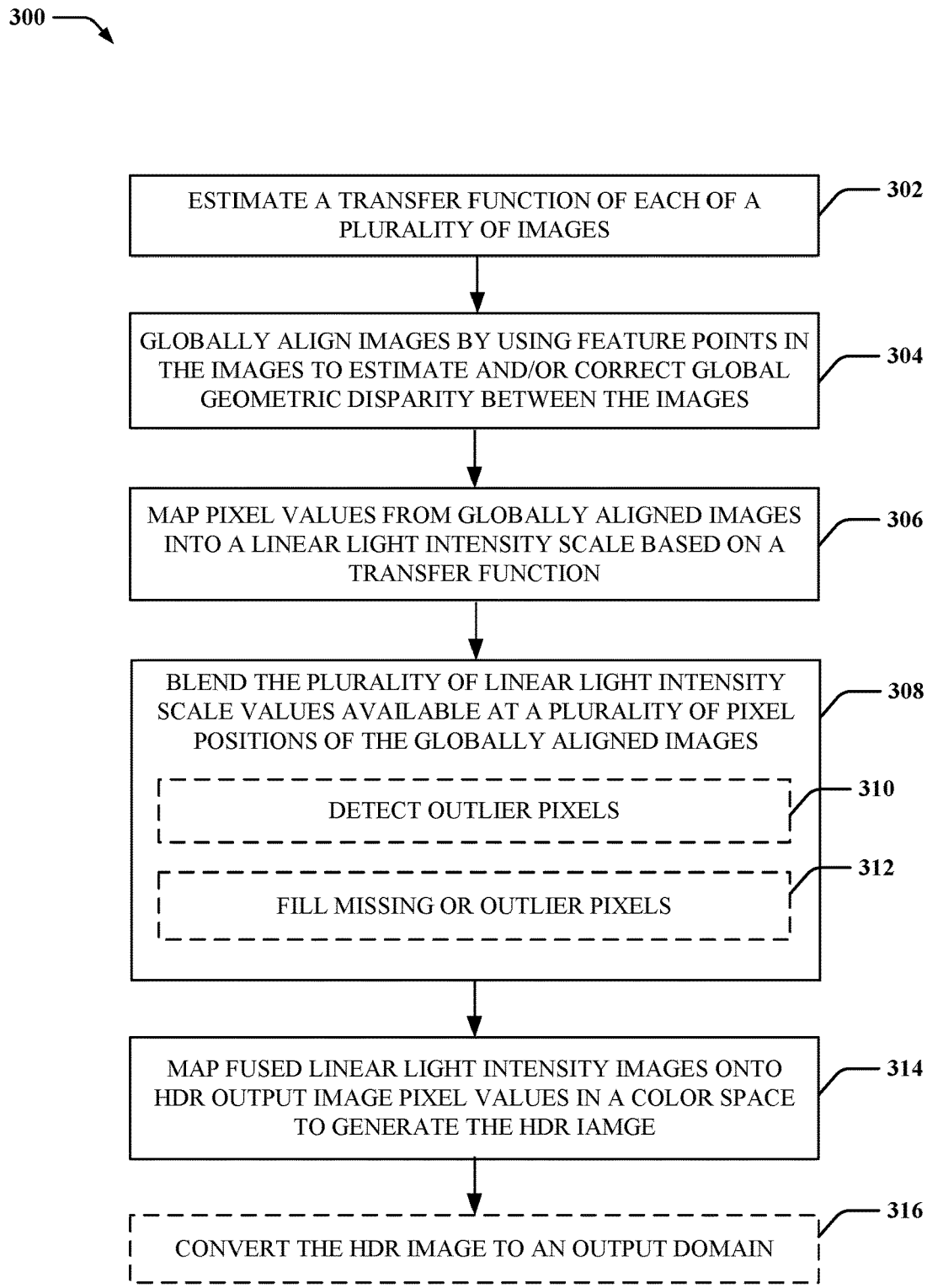
FIG. 3 is a flow diagram of an example of a method for generating HDR images from a plurality of images by blending linear light intensity in the plurality of images.

Turning now to FIGS. 1-4, examples are depicted with reference to one or more components and one or more methods that may perform the actions or operations described herein, where components and/or actions/operations in dashed line may be optional. Although the operations described below in FIGS. 2-3 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a device 100 (e.g., a computing device) that can convert images of a first bit depth to a second larger bit depth. In an example, device 100 can include a processor 102 and/or memory 104 configured to execute or store instructions or other parameters related to converting images, as described further herein. For example, processor 102 and memory 104 may be separate components communicatively coupled by a bus (e.g., on a motherboard or other portion of a computing device, on an integrated circuit, such as a system on a chip (SoC), etc.), components integrated within one another (e.g., processor 102 can include the memory 104 as an on-board component), and/or the like. Memory 104 may store instructions, parameters, data structures, etc. for use/execution by processor 102 to perform functions described herein. Device 100 can optionally include one or more image sensors 106, 108 for capturing images of a real world scene, and a HDR image component 110 for generating a HDR image 112 with a larger bit depth than images captured by the image sensor(s) 106, 108. Device 100 can also optionally include a display 114 for displaying HDR images 112 via a display driver 116. For example, the display 114 may include a liquid crystal display (LCD), plasma display, etc., which may also include a touch interface. In an example, device 100 may include one of HDR image component 110 for capturing HDR images or the display driver 116 for displaying the HDR images.

In an example, HDR image component 110 can include an optional parameter varying component 118 for modifying one or more intensity parameters for one or more image sensors 106, 108 for capturing images of a real world scene, an intensity information determining component 120 for determining intensity information for an image of the real world scene based at least in part on images captured by the one or more image sensors 106, 108 based on different intensity parameters, and/or a pixel generating component 122 for generating one or more pixels for a HDR image 112 based on pixels of one or more of the images and the determined intensity information. HDR image component 110 can generate the HDR image 112 in this regard, which can be provided to memory 104 for storing, to display 114 for displaying (via display driver 116), to a transceiver (not shown) for providing the HDR image 112 to a remote storage repository, to another device for storing or displaying, etc.

In an example, display driver 116 can include an intensity information obtaining component 124 for obtaining intensity information for one or more pixels as stored in an HDR image 112 container, and/or a pixel color selecting component 126 for selecting a color for displaying a pixel based on the intensity information. Display driver 116 can provide information for displaying the HDR image 112 on display 114 (e.g., via a display interface) based on the selected pixel colors.

FIG. 2 is a flowchart of an example of a method 200 for generating HDR images from a plurality of lower bit depth images. For example, method 200 can be performed by a device 100 and/or one or more components (e.g., an HDR image component 110) thereof to facilitate generating the HDR images.

In method 200, optionally at action 202, intensity parameters of one or more image sensors can be varied. In an example, parameter varying component 118, e.g., in conjunction with processor 102, memory 104, HDR image component 110, etc., can vary the intensity parameters of the one or more image sensors 106, 108. For example, parameter varying component 118 can vary a photon sensitivity (e.g., the amount of photon collected by the image sensor(s) 106, 108), light intensity (e.g., the light intensity expressed in pixel data by the image sensor(s) 106, 108), or other parameters of the one or more image sensors 106, 108 that are used to capture or otherwise process the plurality of images. For example, the intensity parameters may relate to different exposure parameters, international standards organization (ISO) speeds, analog gains, digital gains, etc. In an example, parameter varying component 118 can vary the intensity parameters of each of a plurality of image sensors 106, 108 to be different from one another for capturing multiple images of a single real world scene by each of the plurality of image sensors 106, 108. In another example, parameter varying component 118 can vary the intensity parameters of a single image sensor 106 to be different in capturing sequential images of the real world scene, alternating pixels in an image of the real world scene, etc.

In either case, parameter varying component 118 varies the intensity parameters to be different for the purpose of capturing multiple images of the real world scene to allow for comparing the images to determine intensity information. For example, parameter varying component 118 may vary the intensity parameters via an interface to the image sensor(s) 106, 108, image signal processor(s) associated therewith, etc., to allow for modifying the intensity parameters in capturing or processing the corresponding images. In another example, images with varying intensity parameters can be obtained from other sources and provided to HDR image component 110 for further processing. In an ideal situation, the intensity in real world is sampled with a plurality of images such that at least in one image there are no or a minimal number of saturated pixels (e.g., pixels at the higher end of intensity), while in another example, there may be one image where pixels are mostly dark or just noise.

In method 200, at action 204, a plurality of images of a real world scene can be obtained, where at least two of the plurality of images are captured based on different intensity parameters. In an example, HDR image component 110, e.g., in conjunction with processor 102, memory 104, etc., can obtain the plurality of images of the real world scene, where at least two of the plurality of images are captured based on different intensity parameters. As described, HDR image component 110 can obtain plurality of images from one or more image sensors 106, 108, or other sources that can provide images of similar scenes where the images are associated with different intensity parameters. In an example, HDR image component 110 may obtain the images from an image signal processor associated with the image sensor(s) 106, 108, and/or may obtain the images as already stored in an image container associated with the first bit depth (e.g., a JPEG container). In one example, the first bit depth of the images from image sensor(s) 106, 108 can be less than a bit depth of the HDR image 112 (e.g., the first bit depth can be standard dynamic range (SDR), such as 8-bit, and the corresponding HDR image 112 can be generated as 10-bit). In another example, the first bit depth of the images from image sensor(s) 106, 108 can be 10-bit, and the corresponding HDR image 112 can be generated as 12-bit, and so on, such that the bit depth of the HDR image 112 is greater than that of the plurality of images captured by image sensor(s) 106, 108.

In an example, in obtaining the plurality of images at action 204, optionally at action 206, multiple image frames of the real world scene can be obtained based on the different intensity parameters. In an example, HDR image component 110, e.g., in conjunction with processor 102, memory 104, etc., can obtain the multiple frames of the real world scene based on the different intensity parameters. For example, HDR image component 110 can obtain the multiple frames where one frame is captured or processed at a different photon sensitivity, light intensity, etc. as another frame.

In one example, in obtaining the multiple frames at action 206, optionally at action 208, multiple sequential frames can be obtained. In an example, HDR image component 110, e.g., in conjunction with processor 102, memory 104, etc., can obtain the multiple sequential frames, which can include obtaining two or more images of the real world scene within a short period of time (e.g., using a burst mode to capture images as quickly as the hardware of the image sensor allows). As described, for example, HDR image component 110 may obtain the multiple sequential frames from a single image sensor 106. In addition, for example, parameter varying component 118 may vary the intensity parameters of the image sensor 106 for the multiple sequential frames to provide the plurality of images based on different intensity parameters.

In another example, in obtaining the multiple frames at action 206, optionally at action 210, at least one of the plurality of images can be obtained from a first image sensor and at least another one of the plurality of images can be obtained from a second image sensor. In an example, HDR image component 110, e.g., in conjunction with processor 102, memory 104, etc., can obtain at least one of the plurality of images from the first image sensor and at least another one of the plurality of images from the second image sensor. For example, HDR image component 110 can operate the multiple image sensors 106, 108 (and/or additional image sensors) to obtain the plurality of images at a similar time. In an example, the multiple image sensors 106, 108 can be similarly positioned on, or with respect to, the device 100 such to capture the same or a similar real world scene. In any case, HDR image component 110, in this example, can obtain similar images from the image sensors 106, 108. In addition, for example, parameter varying component 118 may vary the intensity parameters of the image sensors 106, 108, or related image signal processors, to be different from one another to provide the plurality of images based on different intensity parameters.

In another example, in obtaining the plurality of images at action 204, optionally at action 212, interleaved pixels can be obtained based on the different intensity parameters. In an example, HDR image component 110, e.g., in conjunction with processor 102, memory 104, etc., can obtain the interleaved pixels based on the different intensity parameters. In an example, parameter varying component 118 can vary the intensity parameters of one or more image sensor(s) 106, 108 in capturing interleaved pixels. For example, image sensor 106 can capture a set of interleaved pixels (e.g., odd indexed pixels) based on first intensity parameters, and can capture one or more other sets of interleaved pixels (e.g., even indexed pixels) based on different intensity parameters. In one example, the image sensor 106 may accept input corresponding to the varying intensity parameters, and can be configured to capture or otherwise process to have interleaved pixels based on the varying intensity parameters. In any case, for example, parameter varying component 118 may vary the intensity parameters of the image sensor 106 in capturing each pixel to provide the image (or each image of interleaved pixels) based on different intensity parameters.

In method 200, at action 214, intensity information for the real world scene can be determined based at least in part on processing the at least two of the plurality of images captured at the different intensity parameters. In an example, intensity information determining component 120, e.g., in conjunction with processor 102, memory 104, HDR image component 110, etc., can determine the intensity information for the real world scene based at least in part on processing the at least two of the plurality of images captured at the different intensity parameters. For example, intensity information determining component 120 may compare the at least two of the plurality of images to determine the intensity information based on differences in pixel color resulting from the different intensities. For example, the intensity information can include light intensity information (e.g., linear light intensity scale values, etc.). In an example, intensity information determining component 120 can determine the intensity information per pixel of the at least two images. For instance, intensity information determining component 120 may perform a matching process to match pixels of the at least two images to the same part of the real world scene. In one implementation the matching may be performed by one or more processes to match each pixel or a collection of pixels of one image to those of the another image, which may be based on matching similar color profiles of the pixels or collection of pixels, detecting feature points, lines, or curves in the at least two images and associating the pixels of the feature points, lines or curves, etc. The plurality of pictures can then be aligned to one of the pictures (which can be referred to as a reference picture)

through a global affine transformation that compensates for differing viewpoints, differing field of view, and/or differing scales.

In method 200, at action 216, a HDR image of the real world scene can be generated based at least in part on adding the intensity information to pixels of at least one of the plurality of images. In an example, pixel generating component 122, e.g., in conjunction with processor 102, memory 104, HDR image component 110, etc., can generate the HDR image 112 of the real world scene based at least in part on adding the intensity information to pixels of at least one of the plurality of images. In an example, determining the intensity information at action 214 and generating the HDR image at action 216 can be a multi-step process, an example of which is provided in FIG. 3, as explained below.

FIG. 3 is a flowchart of an example of a method 300 for generating HDR images from a plurality of captured images. For example, method 300 can be performed by a device 100 and/or one or more components (e.g., an HDR image component 110) thereof to facilitate generating the HDR images.

In method 300, at action 302, a transfer function can be estimated for each of a plurality of images. In an example, pixel generating component 122, e.g., in conjunction with processor 102, memory 104, HDR image component 110, etc., can estimate the transfer function of each of the plurality of images. For example, the transfer function may include one or more of an opto-eletric transfer function (OETF), also referred to as a camera transfer function (CTF), that maps incoming light into pixel values in the captured image, and/or its inverse representation, inverse CTF (ICTF). For example, in some systems, characteristics of commercially available sensors and the ISP tuning may be known deterministically, within some tolerance. For arbitrary systems, in an example, an inverse of International Telecommunication Union (ITU) Radio Communication Sector (ITU-R) Recommendation 709 OETF can be used as a starting point for estimating CTF. In addition, the plurality of images may correspond to the captured images obtained by HDR image component 110 (e.g., at action 204).

In method 300, at action 304, the images can be globally aligned by using feature points in the images to estimate and/or correct global geometric disparity between the images. In an example, pixel generating component 122, e.g., in conjunction with processor 102, memory 104, HDR image component 110, etc., can globally align the images (e.g., at least a portion of the plurality of images) by using feature points in the images to estimate and/or correct global geometric disparity between the images. For example, the images may have disparities based on environmental, mechanical, etc. inconsistencies when capturing the images. In this regard, pixel generating component 122 can detect and/or correct such disparity through feature point extraction/determination, affine, other transformations, etc.

In method 300, at action 306, pixel values from globally aligned images can be mapped into a linear light intensity scale based on a transfer function. In an example, pixel generating component 122, e.g., in conjunction with processor 102, memory 104, HDR image component 110, etc., can map pixel values from the globally aligned images into the linear light intensity scale based on the transfer function. For example, this may be a similar or different transfer function than is estimated at action 302 to map incoming light to the pixel values. For example, pixel generating component 122 may use the estimated ICTF to map back pixel values from at least a portion of the globally aligned plurality of images into a pixel value on a linear light intensity scale. Moreover, for example, pixel generating component 122 can perform the mapping for each color plane (e.g., RGB).

In method 300, at action 308, the plurality of linear light intensity scale values available at a plurality of pixel positions of the globally aligned images can be blended. In an example, pixel generating component 122, e.g., in conjunction with processor 102, memory 104, HDR image component 110, etc., can blend the plurality of linear light intensity scale values available at a plurality of pixel positions of the globally aligned images. For example, pixel generating component 122 can iterate over all pixel positions (e.g., or at least the pixel positions that are globally aligned among the plurality of images) and can blend (or fuse) the plurality of linear light intensity scale values available at that pixel position. In one example, blending the values may include averaging or applying some other function, such as weighted median, to the values to generate a single linear light intensity scale value indicative of the plurality of linear light intensity scale values for the pixel. In addition, for example, pixel generating component 122 can perform the blending for each color plane (e.g., RGB).

In blending the linear light intensity scale values at action 308, optionally at action 310, outlier pixels can be detected. For example, pixel generating component 122, e.g., in conjunction with processor 102, memory 104, HDR image component 110, etc., can detect the outlier pixels. For example, pixel generating component 122 can detect outlier pixels in the globally aligned images as one or more pixels caused by local object movement in real world. In one example, pixel generating component 122 can determine whether a pixel value is an outlier or not due to object movement by using one or more mechanisms such as a Random sample consensus (RANSAC) method on local sum of absolute deltas across aligned pictures. In an example, pixel generating component 122 can determine the minimum and the maximum among plurality of linear light intensity scale values at a given pixel position as outlier pixels. Where pixel generating component 122 determines that a pixel value at a pixel position is saturated (e.g., the associated light intensity exceeds a maximum threshold) or at the floor (e.g., the associated light intensity is less than a minimum threshold) in the captured image, pixel generating component 122 can determine the pixel value as an outlier.

In addition, for example, in blending the linear light intensity scale values at action 308, optionally at action 312, missing or outlier pixels can be filled. For example, pixel generating component 122, e.g., in conjunction with processor 102, memory 104, HDR image component 110, etc., can fill the missing or outlier pixels. In one example, pixel generating component 122 may reject or otherwise flag the outlier pixels for filling. In one example, pixel generating component 122 can apply a spatial interpolation mechanism to fill-in missing or outlier pixels, similar to dead-pixel correction. For example, pixel generating component 122 can perform the spatial interpolation at a given pixel position where all contributing pixel values (e.g., of the globally aligned images) are marked as outliers, missing, or otherwise rejected.

In method 300, at action 310, the fused linear light intensity images can be mapped onto HDR output image pixel values in a color space to generate the HDR image. In an example, pixel generating component 122, e.g., in conjunction with processor 102, memory 104, HDR image component 110, etc., can map the fused linear light intensity images onto HDR output image pixel values in the color space to generate the HDR image. For example, pixel generating component 122 can map the fused linear light intensity images onto output HDR image pixel values using a HDR-CTF, which can be done for each color plane (e.g., RGB). For instance, The HDR-CTF could be linear, could follow one or more specifications, such as HDR-perceptual quantizer (PQ), HDR-hybrid log gamma (HLG), etc. For example, the HDR output image pixel values may allow for specifying the additional linear light intensity over a different output pixel for the plurality of images as originally captured. Thus, the HDR image is created using the additional possible linear light intensity.

In method 300, optionally at action 312, the HDR image can be converted to an output domain. In an example, pixel generating component 122, e.g., in conjunction with processor 102, memory 104, HDR image component 110, etc., can convert (or package) the HDR image to an output domain. For example, the output domain may include a YUV with 10-bit or a 12-bit representation. In this regard, pixel generating component 122 may convert at least RGB of the HDR image 112 to a YUV domain by using one or more color transformation matrices (e.g., as specified in ITU-R Recommendation BT.2020 or other specifications). Pixel generating component 122 may also, for example, resample the U and V places to achieve a target (e.g., planar 4:2:2 or planar 4:2:0), change a bit depth to a target (e.g., from floating point to 10-bit, 12-bit, 16-bit, etc.) by multiplying with a constant and rounding operations. Nominally, the intermediate pixel values during computation can be stored in a floating point or a double precision representation (e.g., by memory 104), while fixed point representation is also possible. Moreover, pixel generating component 122 may, for example, scan the Y, U, and V planes to a packaging (e.g., memory layout) specified for a destination YUV format.

In any case, the HDR image 112, once generated, or as it is being generated, can be provided to memory 104 for storage, provided to display driver 116 for displaying, provided to another device via a transceiver (not shown) configured to communicate with the device over a wired or wireless communication interface, etc.

Figure 4:
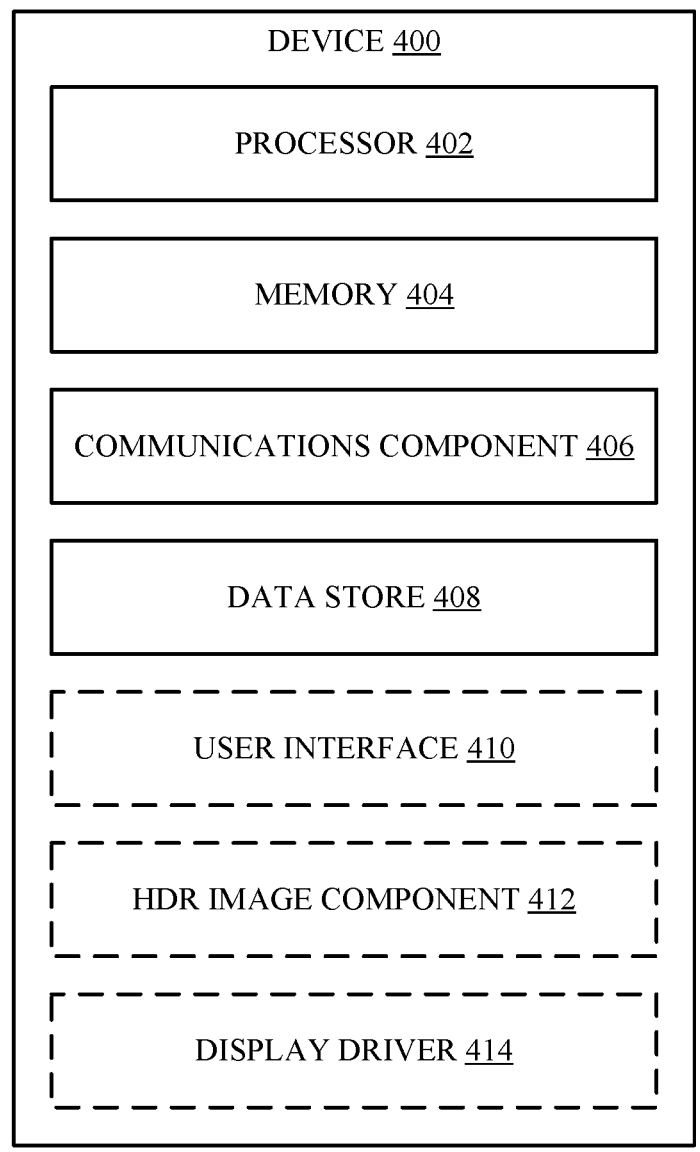
FIG. 4 is a schematic diagram of an example of a device for performing functions described herein.

FIG. 4 illustrates an example of device 400 including additional optional component details as those shown in FIG. 1. In one aspect, device 400 may include processor 402, which may be similar to processor 102 for carrying out processing functions associated with one or more of components and functions described herein. Processor 402 can include a single or multiple set of processors or multi-core processors. Moreover, processor 402 can be implemented as an integrated processing system and/or a distributed processing system.

Device 400 may further include memory 404, which may be similar to memory 104 such as for storing local versions of operating systems (or components thereof) and/or applications being executed by processor 402, such as HDR image component 412, display driver 414, etc., related instructions, parameters, etc. Memory 404 can include a type of memory usable by a computer, such as random access memory (RAM), read only memory (ROM), tapes, magnetic discs, optical discs, volatile memory, non-volatile memory, and any combination thereof.

Further, device 400 may include a communications component 406 that provides for establishing and maintaining communications with one or more other devices, parties, entities, etc. utilizing hardware, software, and services as described herein. Communications component 406 may carry communications between components on device 400, as well as between device 400 and external devices, such as devices located across a communications network and/or devices serially or locally connected to device 400. For example, communications component 406 may include one or more buses, and may further include transmit chain components and receive chain components associated with a wireless or wired transmitter and receiver, respectively (or collectively a transceiver), operable for interfacing with external devices.

Additionally, device 400 may include a data store 408, which can be any suitable combination of hardware and/or software, that provides for mass storage of information, databases, and programs employed in connection with aspects described herein. For example, data store 408 may be or may include a data repository for operating systems (or components thereof), applications, related parameters, etc., not currently being executed by processor 402. In addition, data store 408 may be a data repository for HDR image component 412, display driver 414, and/or one or more other components of the device 400.

Device 400 may optionally include a user interface component 410 operable to receive inputs from a user of device 400 and further operable to generate outputs for presentation to the user. User interface component 410 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 410 may include one or more output devices, including but not limited to a display, a speaker, a haptic feedback mechanism, a printer, any other mechanism capable of presenting an output to a user, or any combination thereof.

Device 400 may additionally include an HDR image component 412, which may be similar to HDR image component 110, for generating one or more HDR images from images of a lower bit depth, and/or a display driver 414, which may be similar to display driver 116 for displaying one or more HDR images including pixel intensity information, as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for generating an image from a plurality of images, comprising:
    obtaining, via one or more image sensors, the plurality of images of a real world scene, wherein at least two of the plurality of images are captured at a first bit depth and based on different intensity parameters;
    determining light intensity information for the real world scene based at least in part on processing the at least two of the plurality of images; and
    generating the image corresponding to the real world scene, at a second bit depth that is larger than the first bit depth, based at least in part on adding the light intensity information in additional bits added by the second bit depth to pixels of at least one of the plurality of images captured at the first bit depth.

2. The method of claim 1, wherein obtaining the plurality of images comprises obtaining multiple frames of the real world scene captured based on the different intensity parameters.

3. The method of claim 2, wherein the multiple frames of the real world scene correspond to multiple sequential frames.

4. The method of claim 2, wherein the multiple frames of the real world scene include at least a first frame obtained from one of the one or more image sensors and a second frame obtained from another one of the one or more image sensors at a similar time.

5. The method of claim 1, wherein obtaining the plurality of images comprises obtaining interleaved pixels of the real world scene based on the different intensity parameters.

6. The method of claim 1, wherein the different intensity parameters correspond to at least one of different photon sensitivities, different light intensities, or differing exposures.

7. The method of claim 6, wherein the at least one of different photon sensitivities or different light intensities correspond to at least one of different exposure parameters, international standards organization (ISO) speeds, analog gains, or digital gains.

8. The method of claim 1, wherein generating the image comprises globally aligning the plurality of images, mapping pixel values from the plurality of images to a linear light intensity scale, and blending values of the linear light intensity scale for each of the pixel values.

9. The method of claim 1, wherein the light intensity information includes a linear light intensity scale value determined for each of one or more pixels of the plurality of images.

10. A device for generating an image from a plurality of images, comprising:
    one or more image sensors configured to obtain the plurality of images of a real world scene, wherein at least two of the plurality of images are captured at a first bit depth and based on different intensity parameters;
    a memory for storing one or more parameters or instructions for generating the image from the plurality of images; and
    at least one processor coupled to the memory, wherein the at least one processor is configured to:
        determine light intensity information for the real world scene based at least in part on processing the at least two of the plurality of images; and
        generate the image corresponding to the real world scene, at a second bit depth that is larger than the first bit depth, based at least in part on adding the light intensity information in additional bits added by the second bit depth to pixels of at least one of the plurality of images captured at the first bit depth.

11. The device of claim 10, wherein the one or more image sensors obtain the plurality of images as multiple frames of the real world scene based on the different intensity parameters.

12. The device of claim 11, wherein the multiple frames of the real world scene correspond to multiple sequential frames.

13. The device of claim 11, wherein the multiple frames of the real world scene include at least a first frame obtained from one of the one or more image sensors and a second frame obtained from another one of the one or more image sensors at a similar time.

14. The device of claim 10, wherein the one or more image sensors obtain the plurality of images as interleaved pixels of the real world scene based on the different intensity parameters.

15. The device of claim 10, wherein the different intensity parameters correspond to at least one of different photon sensitivities or different light intensities.

16. The system of claim 10, wherein the at least one processor is configured to generate the image at least in part by globally aligning the plurality of images, mapping pixel values from the plurality of images to a linear light intensity scale, and blending values of the linear light intensity scale for each of the pixel values.

17. A non-transitory computer-readable medium, comprising code executable by one or more processors for generating an image from a plurality of images, the code comprising code for:
- obtaining, via one or more image sensors, the plurality of images of a real world scene, wherein at least two of the plurality of images are captured at a first bit depth and based on different intensity parameters;
- determining light intensity information for the real world scene based at least in part on processing the at least two of the plurality of images; and
- generating the image corresponding to the real world scene, at a second bit depth that is larger than the first bit depth, based at least in part on adding the light intensity information in additional bits added by the second bit depth to pixels of at least one of the plurality of images captured at the first bit depth.

18. The non-transitory computer-readable medium of claim 17, wherein the code for obtaining the plurality of images comprises code for obtaining multiple frames of the real world scene based on the different intensity parameters.

19. The non-transitory computer-readable medium of claim 18, wherein the multiple frames of the real world scene correspond to multiple sequential frames.

20. The non-transitory computer-readable medium of claim 18, wherein the multiple frames of the real world scene include at least a first frame obtained from one of the one or more image sensors and a second frame obtained from another one of the one or more image sensors at a similar time.

* * * * *